(12) United States Patent
Leung et al.

(10) Patent No.: US 8,363,813 B2
(45) Date of Patent: Jan. 29, 2013

(54) INTELLIGENT SPEED DIALING

(76) Inventors: Yiu Kau Leung, Morganville, NJ (US);
Yiu Man Leung, Somerset, NJ (US)

( * ) Notice: Subject to any disclaimer, the term of this patent is extended or adjusted under 35 U.S.C. 154(b) by 479 days.

(21) Appl. No.: 12/652,033

(22) Filed: Jan. 4, 2010

(65) Prior Publication Data

US 2010/0172484 A1    Jul. 8, 2010

Related U.S. Application Data

(60) Provisional application No. 61/142,871, filed on Jan. 6, 2009.

(51) Int. Cl.
*H04M 3/42*    (2006.01)
(52) U.S. Cl. .............................. 379/216.01; 379/201.01
(58) Field of Classification Search ............. 379/216.01, 379/201.01
See application file for complete search history.

(56) References Cited

U.S. PATENT DOCUMENTS 6,192,118 B1 *   2/2001   Bayless et al. ........... 379/201.01
7,190,975 B2 *   3/2007   Rho .............................. 455/564

* cited by examiner

*Primary Examiner* — Quynh Nguyen

(57) ABSTRACT

The present invention describes a method and apparatus for providing an intelligent speed dialing service for a phone user according to a pre-selected dialing algorithm. More specifically, this invention provides an intelligent speed dialing feature to call a list of available phone numbers of the person to be contacted. With this invention, a caller can dial pre-programmed speed dialing digits on the phone station to call the person to be contacted, according to a pre-program algorithm, to automatically dial one or multiple phone numbers of the person to be contacted. The present invention greatly improves the convenience of using the speed dialing feature of a phone station, especially when the advanced call forwarding feature such as "follow me" is not available to or not enabled by the person to be contacted.

21 Claims, 5 Drawing Sheets

User A's intelligent dialing code list:

| Intelligent dialing code | Name | Phone 1 | Phone 2 | ... | Phone n | Account number |
|---|---|---|---|---|---|---|
| 1 | John Doe | 1-123-456-1111 | 1-123-456-2222 | | 1-123-456-9999 | 1234 |
| 2 | Jane Doe | 1-234-567-1111 | 1-234-567-1111 | | 1-234-567-1111 | 1234 |
| ... | ... | ... | ... | | ... | 1234 |
| n | My manager | 1-789-111-1111 | 1-789-111-2222 | | 1-789-111-2222 | 1234 |

Figure 1

| Time-of-date preference | yes |
|---|---|
| Phone 1 | 7am-9am EST |
| Phone 2 | 8am-7pm EST |
| Phone 3 | 5pm-10pm EST |
| ... | ... |
| Phone n | Anytime |
| Sequential dialing | Yes |
| Dialing order | Phone 1, phone 3, phone 2... |
| Call back preferred | Phone 1 |
| Simultaneous ringing | no |

User preference for intelligent dialing code 1 of User A

200

...

| Time-of-date preference | no |
|---|---|
| Phone 1 | na |
| Phone 2 | na |
| Phone 3 | na |
| ... | ... |
| Phone n | na |
| Sequential dialing | Yes |
| Dialing order | Phone 1, phone 3, phone 2... |
| Call back preferred | Phone 2 |
| Simultaneous ringing | yes |

User preference for intelligent dialing code 2 of User A

INTELLIGENT SPEED DIALING

CROSS-REFERENCE TO RELATED APPLICATIONS

This application claims the benefit of Provisional Application No. 61/142,871, filed Jan. 6, 2009, the contents of which are incorporated herein in their entirety.

TECHNICAL FIELD

This invention relates to providing an intelligent speed dialing service for a phone user. More specifically, this invention provides an intelligent speed dialing feature to call a list of available phone numbers of the person to be contacted according to a pre-selected dialing algorithm. With this invention, a caller can dial pre-programmed speed dialing digits on the phone station to call the person to be contacted, according to a pre-selected dialing algorithm, the available phone numbers of the person to be contacted will be called, saving the caller the task of redialing different numbers to reach the person to be contacted.

BACKGROUND

As technology advances and working habits change, it is very common for people to be reachable by multiple phone numbers. For example, they may be reached by their home phone number, office phone number, or mobile phone number. In many cases, the caller has no idea which number can reach the person to be contacted at the time of making the phone call. The only available option for the caller is to dial a different number if the call is not answered. This can be very inconvenient especially if the caller is using a calling card to make the phone calls. In some cases, more than 20 digits need to be dialed to make a phone call when using a calling card service.

Speed dialing is a convenient feature that is available in most phone stations to ease the dialing process. When using this feature, the caller does not need to dial the actual phone number of the person to be contacted, and the number of keys that needs to be entered is much less than the number of digits of the actual phone number. However, the caller still needs to dial the first speed dialing code and then wait for the answer. If the call is not answered, then another speed code must be dialed, and so on.

New advanced call forwarding services such as "follow me" or "find me", as offered by RingCentral and Google Voice (formerly known as GrandCentral), can help save the caller from dialing multiple phone numbers in order to reach the person to be contacted. With such services, a separate phone number is given to the person to be contacted by the phone service provider such as Google Voice. The person to be contacted has to pre-program a list of phone numbers that he/she can be reached on the phone system of his/her service provider using this given phone number, generally through a Web site provided by the service provider. When another person wishes to contact this person, this given phone number is called. The phone service provider then forwards the call to the first phone number on list that is associated with the given phone number. When the first phone number on the list is called and not answered, the next phone number on the list will be called and so on. The caller does not need to dial any additional phone numbers. This will help the person to be contacted avoid missing important phone calls.

Unfortunately, not every person to be contacted has such services available. As mentioned above, the service is associated with the person to be contacted. The caller has no control of such service. If such service is not available or enabled by the person to be contacted, the only option for the caller is to dial all the phone numbers associated with the person to be contacted one at a time until the person to be contacted is reached.

It is desirable to enhance the speed dialing feature to allow the caller to reach the person to be contacted in a simpler dialing procedure. The prior art does not present a solution for a more convenient dialing procedure to reach a person to be contacted with multiple phone numbers.

The present invention provides a method and apparatus to allow a phone user to program a more convenient dialing procedure to reach a person to be contacted with multiple phone numbers using a pre-selected dialing algorithm selected by the user.

SUMMARY OF THE INVENTION

The present invention provides a method and apparatus to allow a phone user to use speed dialing to reach a person to be contacted with one or multiple phone numbers with pre-selected algorithms.

In one aspect of the present invention, a phone service provider provides provisioning user interface to the user to program a list of intelligent speed dialing codes. Each intelligent speed dialing code is associated with one or more PSTN numbers of the person to be contacted. Such provisioning interface can be a Web application, or an interactive voice response (IVR) system that can be accessed through any phone station. Different provisioning interface used to program the intelligent speed dialing code list does not change the nature of the invention.

In another aspect of the present invention, a user preference can be associated with each intelligent speed dialing code. The user preference can include any pre-selected algorithm to call the person to be contacted. The pre-selected algorithm can include time-of-day constraints, order of calling, repeatedly dialing if busy, or prompt before calling, call back etc. Different algorithm used with the user preference does not change the nature of the invention.

In another aspect of the present invention, the user programs the speed dialing feature of the phone station to call the person to be contacted using the intelligent speed dialing code. There are many known methods to program the speed dialing feature on the phone station. The method of programming the speed dialing feature does not change the nature of the present invention.

In another aspect of the present invention, a call processing server handles the phone calls using the intelligent speed dialing feature of the present invention. When one of the intelligent speed dialing codes is called, the list of phone numbers along with the user preference associated with the intelligent speed dialing code is retrieved. The call processing server then sets up the call to the person to be contacted using one or more of the phone numbers in the list associated with the intelligent speed dialing code using the pre-selected dialing algorithm included in the user preference. The algorithm can include one or more of the following: time-of-day constraints, order of calling, repeatedly dialing if busy, or prompt before calling, call back etc. The algorithm used with the user preference does not change the nature of the invention.

In another aspect of the present invention, a phone station handles the phone calls using the intelligent speed dialing feature of the present invention. When one of the intelligent speed dialing codes is entered, the list of phone numbers along with the user preference associated with the intelligent speed dialing code is retrieved. The phone station then dials one or more of the phone numbers in the list associated with the intelligent speed dialing code using the dialing algorithm. The algorithm can include one or more of the following: time-of-day constraints, order of calling, repeatedly dialing if busy, or prompt before calling, call back etc. The algorithm used with the user preference does not change the nature of the invention.

These and other embodiments of the present invention permit an user to program the speed dialing feature of a phone station to automatically dial one or multiple phone numbers of the person to be contacted based on an algorithm of user preference. The present invention greatly improves the convenience of using the speed dialing feature of a phone station, especially when the advanced call forwarding feature such as "follow me" is not available to or not enabled by the person to be contacted.

BRIEF DESCRIPTION OF THE DRAWINGS

FIG. 1 is a diagram showing a sample of database records of intelligent speed dialing codes in a user profile database.

FIG. 2 is a diagram showing a sample of user preference records for a user in a user profile database.

DETAILED DESCRIPTION OF THE INVENTION

Figure 3:
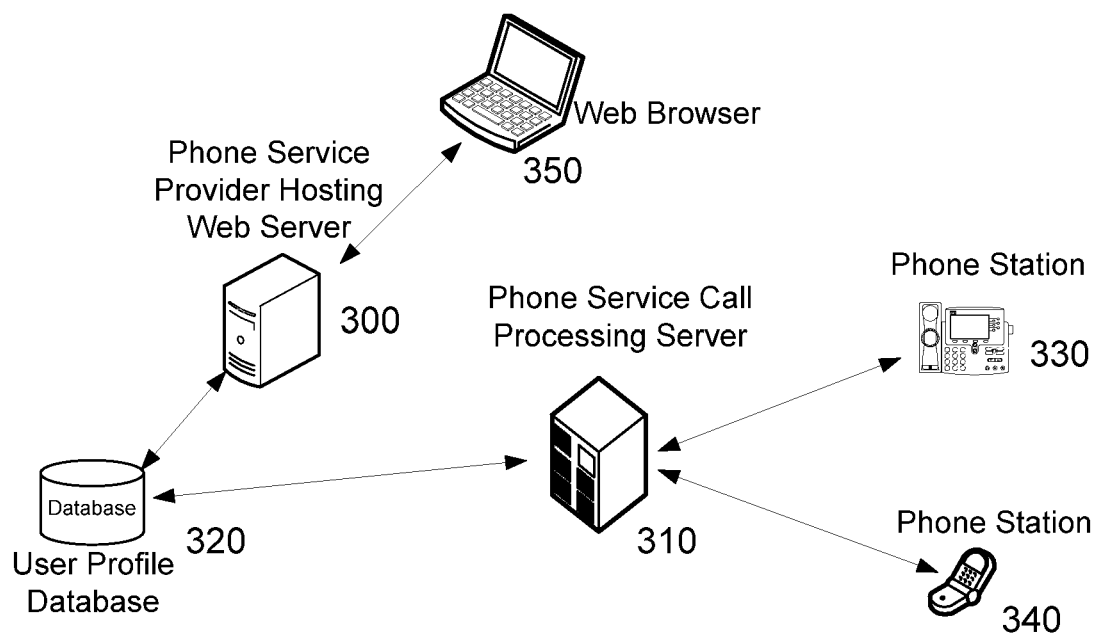
FIG. 3 is a diagram of methods to provision a list of intelligent speed dialing codes and user preference into a user profile database.

In one aspect of the present invention, a phone service provider provides provisioning user interface to the user to provision a list of intelligent speed dialing codes. Each intelligent speed dialing code is associated with one or more PSTN numbers of the person to be contacted. Such provisioning interface can be a Web application, or an interactive voice response (IVR) system that can be accessed through any phone station. A different provisioning interface used to program the intelligent speed dialing code list does not change the nature of the invention.

FIG. 1 shows an example of intelligent speed dialing code record. The first column is the intelligent speed dialing code. The second column is the reference name of the person to be contacted. Columns 3-6 is a list of phone numbers that are associated with the intelligent speed dialing code. The list of phone numbers are the phone numbers that can reach the person to be contacted as known by the caller. This is significantly different from the "find me" or "follow me" features that the person to be contacted has to provision the list of the phone numbers which might not be known to the caller. Column 7 is the account number of the caller. To those skilled in the art, there are different ways to organize the record. Different ways to organize the record do not change the nature of the present invention.

The list of intelligent speed dialing codes can be stored in a database, or in memory. The list of intelligent speed dialing codes can be stored in a database server, or in the phone station. Method and location of storing the intelligent speed dialing codes do not change the nature of the present invention.

In another aspect of the present invention, a user preference can be associated with each intelligent speed dialing code. The user preference can include any pre-selected algorithm to call the person to be contacted. The pre-selected algorithm can include but not limited to time-of-day constraints, order of calling, repeatedly dialing if busy, or prompt before calling, call back etc.

In a typical implementation, the phone service provider will provide a list of supported dialing algorithms that a user can choose from. The user then selects the dialing algorithm from the list for each intelligent speed dialing code. As needed by the algorithm, some algorithms may need user specified parameters as personal preferences, such as time-of-day ranges, sequential order of phone numbers to be called, repeatedly dialing if busy, prompt before calling, callback preferred, simultaneous ringing etc.

FIG. 2 shows a sample of user preference records of a user. There is one table associated with one intelligent speed dialing code respectively. For example, tables 200 and 210 are different records for intelligent speed dialing code 1 and 2 respectively. It is also possible that more than one intelligent speed dialing codes share the same preference. The table shows some of many possible dialing algorithms to handle the list of phone numbers that are associated with an intelligent speed dialing code. For example for dialing code 1 200, the phone numbers are first filtered by the time-of-day preference. Based on the current time of calling and the day-of-time preference for each phone number, a list of phone number that satisfies the preference is selected. For example, if the current time is 9 am, phone 1, phone 2 and phone n both satisfy the time-of-day preference and are selected. Since sequential dialing is preferred, the preferred dialing order phone 1, phone 2, and phone n is used to call the person to be contacted in a sequential order, i.e. phone 1 is dialed first, if not answered after a period of time, then phone 2 is dialed, and so on. Note that phone 3 is not in the preferred list based on the time-of-day preference and is therefore not dialed.

The dialing algorithm can further take advantage of the current geographical location of the phone station. There are many known methods for the phone station to identify the geographical location, namely GPS (Global Positioning System), or Wireless Triangulation. The method used to identify the geographical location of the phone station is outside the scope of the present invention.

One possible way to take advantage of the current geographical location is to select different dialing method based on the location. The dialing algorithm can determine the most economical way to contact the person being called. For example, due to tariff difference, in some cases it is cheaper to initiate a call from one location than another location. For example, it is cheaper to initiate a call from the United States to China than to initiate a call from China to the United States. A call back feature as offered by some service providers can be combined with the present invention to provide a convenient way to contact a person with the most economical cost.

As shown in table 200, phone 1 prefers the call back feature. The call back feature can be implemented as following. After the person to be contacted answers the call at phone 1, the call is put on hold. The connection between the caller and the call processing server is dropped. A new call is initiated from the call processing server to the caller. Finally the call processing server bridges the calls between the caller and the person to be contacted. This is one of many ways to implement a call back feature. Methods to implement the call back feature do not change the nature of the present invention.

The dialing algorithm can also determine the time zone of the current geographical location to make necessary adjustment to the day-of-time preference for each phone number associated with a intelligent dialing code. For example, if the current location is Los Angeles, Calif., the time zone is PST.

If the current location time is 9 am, which corresponds to 12:00 noon. In the previous example of the intelligent dialing code 1 200, only phone 2 and phone n satisfy the time-of-day preference and are therefore selected.

The dialing algorithm can further take advantage of the current geographical to determine the international dialing code. For example, in the United States, the international dialing code is 011; while in the United Kingdom, the international dialing code is 00. The feature can save the user from remembering the international dialing code of current geographical location.

The above description shows only one of many possible algorithms to handle the phone call using the list of phone numbers associated with an intelligent speed dialing code. A different dialing algorithm used within the user preference does not change the nature of the invention.

There are many known methods to provision the list of intelligent speed dialing codes and associated user preferences into a user profile database 320 as shown in FIG. 3. The user profile data can be stored in tables or any database record formats. The method of storing the user profile data does not change the nature of the present invention. A user can login in to the Web application server 300 hosted by the phone service provider using any Web browser 350. The Web application provides the necessary user interface for the user to enter the data. A user can also provision the list using an IVR system by dialing a special PSTN access number provided by the same phone service provider from any phone station 330, 340. The call processing server 310 provides the necessary IVR system to provision the list through a phone station. The user can also provision the intelligent speed dialing codes and associated user preferences directly on to a phone station. The method of provisioning the list of intelligent speed dialing codes and associated user preferences does not change the nature of the present invention.

In another aspect of the present invention, the user programs the speed dialing feature of the phone station with a one or more digits speed dialing code to associate with an intelligent speed dialing code to call the person to be contacted. The speed dialing code can be the same as or different from the intelligent speed dialing code. There are many known methods to program the speed dialing feature on the phone station. The method of programming the speed dialing feature does not change the nature of the present invention.

Figure 4:
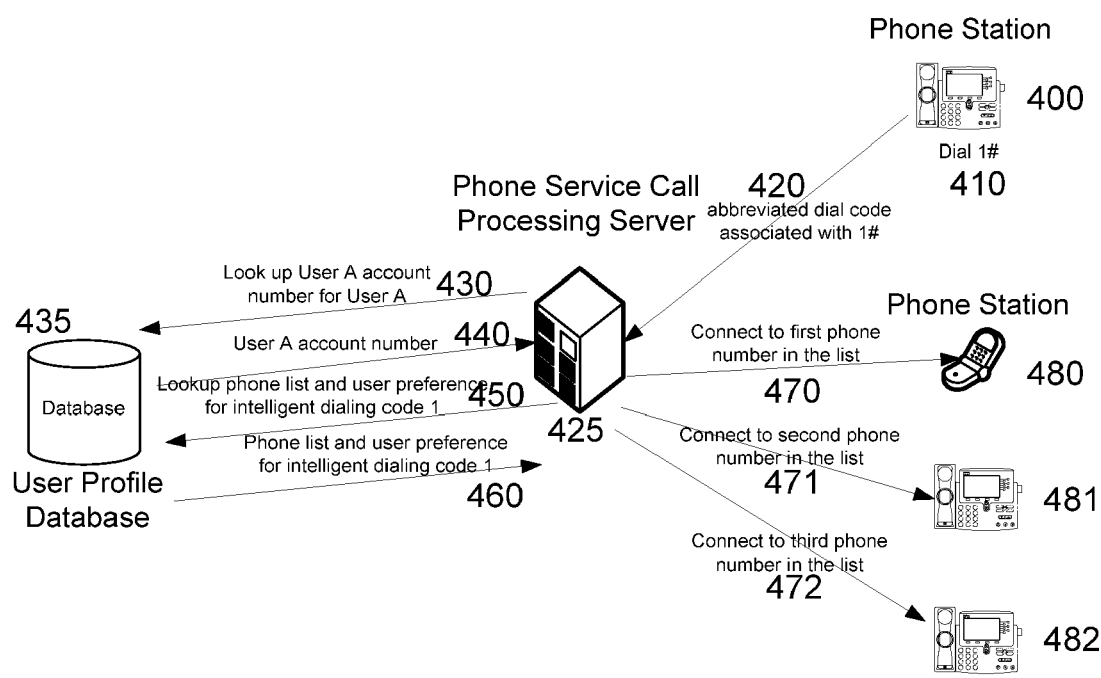
FIG. 4 is a diagram showing the speed dialing call flow using the present invention.

In another aspect of the present invention, a call processing server handles the phone calls using the intelligent speed dialing feature of the present invention. FIG. 4 shows an example flow of handling an intelligent speed dialing code in a call processing server 425. When a user wishes to call a person to be contacted, the speed dialing code 410 associated with the person to be contacted is entered at the phone station 400. The intelligent speed dialing code associated with the speed dialing code is sent to the call processing server in step 420. The intelligent speed dialing code can be sent to the call processing server 425 using any known call processing signaling protocols such as SS7, PRI, SIP, H.323 or any other proprietary protocols. It is also possible that a PSTN access number to the call processing server is first dialed using the PSTN network. After the call processing server answers the call, then the intelligent speed dialing code is sent via the key pad on the phone station or is collected via an IVR system. Methods and protocols used to send the intelligent speed dialing code to the call processing server do not change the nature of the present invention. The call processing server 425 then looks up the account number of the calling party from the database 435 in step 430. There are many different ways to look up the account number of the user. One of them is by indexing the user data profile by the caller ID of the phone station from which the call is making. Method of looking up the user account number does not change the nature of the present invention. After the account number is retrieved from the database in step 440, the account number together with the intelligent speed dialing code is used to look up the list of phone numbers and user preference associated with the intelligent speed dialing code from the database in step 450. After the list of phone numbers and user preference are retrieved from the database in step 460, the call processing server connects the call to one or more the phone numbers in the list 480, 481, 482 according to the pre-defined algorithm in the user preference in steps 470, 471, 472. The connection can be set up using any known call processing signaling protocols such as SS7, PRI, SIP, H.323 or any other proprietary protocols. Methods and protocols used to make the connection do not change the nature of the present invention. The algorithm can include one or more of the following: time-of-day constraints, order of calling, repeatedly dialing if busy, prompt before calling, call back preferred number, simultaneous ringing or other preferences. The algorithm used with the user preference does not change the nature of the invention.

Figure 5:
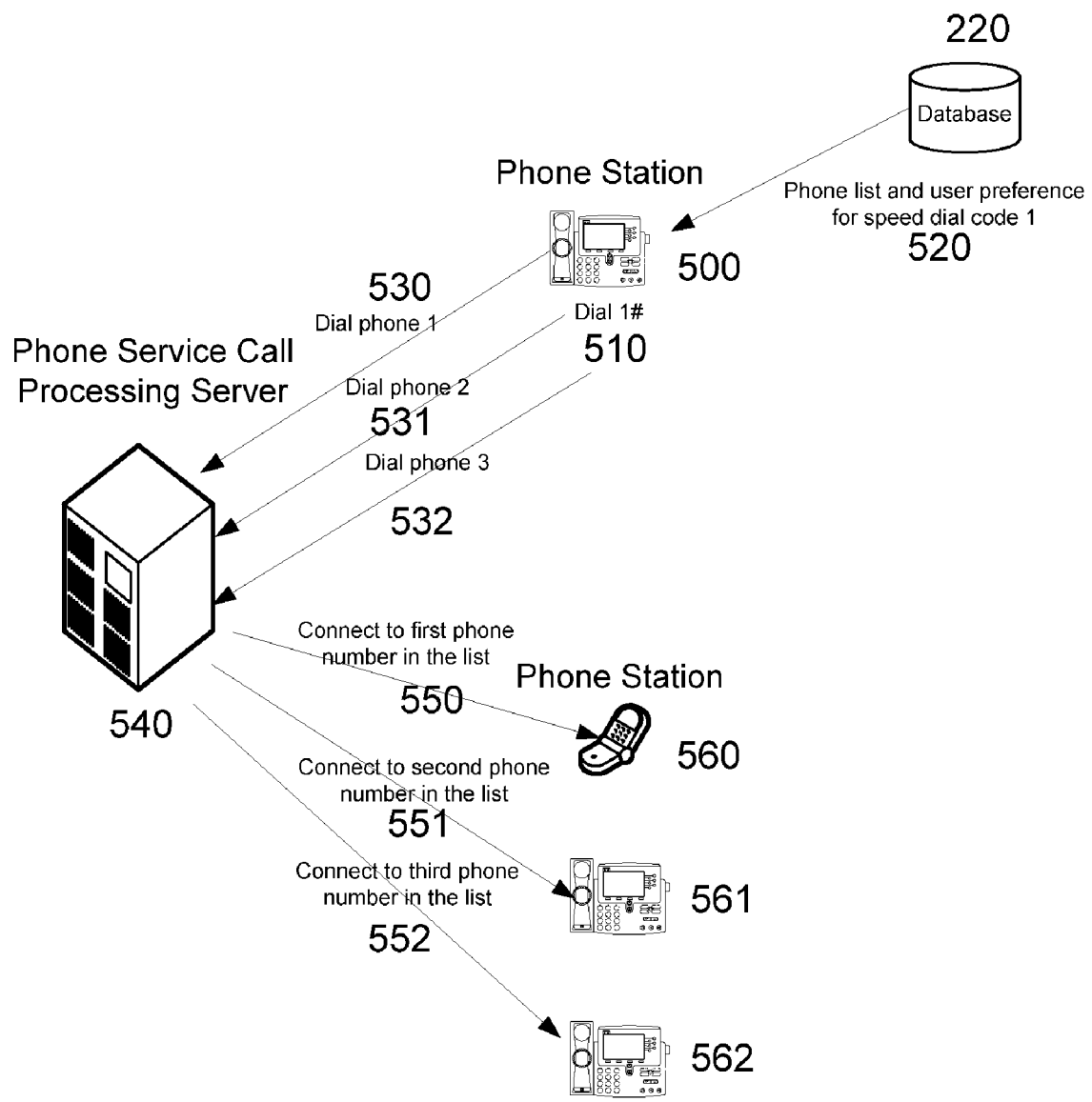
FIG. 5 is a diagram showing another speed dialing call flow using the present invention.

In another aspect of the present invention, a phone station handles the phone calls using the speed dialing feature of the present invention. FIG. 5 shows an example flow of handling an intelligent speed dialing code by the phone station 500. When one of the speed dialing codes 510 is entered, the list of phone numbers of person to be contacted associated with the intelligent speed dialing code which is associated with the speed dialing code is retrieved from the database stored in the memory of the phone station, along with the user preference associated with the intelligent speed dialing code dialing algorithm 520. For easy of implementation, the speed dialing codes can be the same as the intelligent speed dialing code so that the list of phones numbers and user preference can be retrieved directly using the speed dialing code. The phone station then dials one or more of the phone numbers in the list associated with the intelligent speed dialing code with the dialing algorithm in steps 530, 531, 532. The phone call processing server 540 can be any PSTN switching system in this case, including any VoIP call processing systems which connects the calls to the phone stations in steps 560, 561, 562 corresponding to the phone numbers in the list 550, 551, 552, using any known call processing signaling protocols such as SS7, PRI, SIP, H.323 or any other proprietary protocols. Methods and protocols used to make the connection do not change the nature of the present invention. The dialing algorithm can include one or more of the following: time-of-day constraints, order of calling, repeatedly dialing if busy, or prompt before calling, call back, simultaneous ringing etc. The algorithm used with the user preference does not change the nature of the invention.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims

What is claimed is:

1. A method for providing speed dialing on a phone station to call a person to be contacted with multiple PSTN numbers according to a pre-selected dialing algorithm, comprising:

provisioning a list of phone numbers of a person to be contacted;

associating an intelligent speed dialing code with the list of phone numbers of a person to be contacted;

associating a user dialing preference with each intelligent speed dialing code;

storing the lists of phone numbers and user dialing preferences;

retrieving a list of phone numbers of the person to be contacted associated with the intelligent speed dialing code which is associated with the speed dialing digits on the phone;

retrieving a user dialing preference associated with the intelligent speed dialing code;

connecting the call to at least one of the phone numbers of the person to be contacted using the dialing algorithm including in the user dialing preference;

where the user can select at least one dialing pre-defined algorithm and the associated intelligent speed dialing code with a call dialing preference, comprising:

time-of-day constrains of each phone number in a list of phone numbers that can be called;

sequentially calling a list of phone numbers;

simultaneously calling a list of phone numbers;

repeatedly dialing a list of phone numbers if the phone numbers are busy or not answered;

prompt caller before calling a list of phone numbers;

a list of callee's call back preferred numbers.

2. The method of claim 1, wherein the time-of-day constraints of each phone number specifies the local time of day of the locality associated with the phone number to be called.

3. The method of claim 1, wherein sequentially calling a list of phone numbers sets up a call to the first phone number in the list, waits a predefined period, if call is not answer or busy, then sets up a new call to the next phone number in the list. The process repeats until all of the phone numbers are included in the call tree or one of the calls is answered. The call is connected when one of the calls is answered. The call terminates if all the phone numbers are busy or non of the calls are answered for a predefined period.

4. The method of claim 1, wherein simultaneously calling list of phone numbers sets up a call to all of the phone numbers in the list simultaneously. The call is connected when one of the calls is answered. The call terminates if all the phone numbers are busy or none of the calls are answered for a predefined period.

5. The method of claim 1, wherein repeatedly dialing a list of numbers if the phones numbers are busy sets up a call according to the methods of claim 2, 3, or 4. The process repeats for a predefined number of times or until one of the calls is answered.

6. The method of claim 1, wherein a prompt before calling a list of phone numbers announces one of the phone numbers to the caller, then sets up the call to the phone number if the caller confirms the phone number. The process repeats until the caller chooses one of the phone numbers or at the end of the list.

7. The method of claim 1, whereas the list of preferred callback numbers comprises the callee's preferred callback phone numbers using the callback feature provided by some phone service providers.

8. A call processing system for providing speed dialing on a phone station to call a person to be contacted with multiple PSTN numbers according to a pre-selected dialing algorithm, comprising:

a processor to execute computer instructions;

a non-transitory tangible computer readable storage medium comprising computer instructions to perform the steps of:

provisioning a list of phone numbers of a person to be contacted;

associating an intelligent speed dialing code with the list of phone numbers of a person to be contacted;

associating a user dialing preference with each intelligent speed dialing code;

storing the lists of phone numbers and user dialing preferences; retrieving a list of phone numbers of the person to be contacted associated with the intelligent speed dialing code which is associated with the speed dialing digits on the phone;

retrieving a user dialing preference associated with the intelligent speed dialing code;

connecting the call to at least one of the phone numbers of the person to be contacted using the dialing algorithm including in the user dialing preference;

where the user can select at least one dialing pre-defined algorithm and the associated intelligent speed dialing code with a call dialing preference, comprising:

time-of-day constraints of each phone number can be called;

sequentially calling a list of phone numbers;

simultaneously calling a list of phone numbers;

repeatedly dialing a list of phone numbers if the phone numbers are busy;

prompt the caller before calling a list of phone numbers;

a list of callee's call back preferred numbers.

9. The system of claim 8, wherein the call processing system sets up a call to at least one of the phone numbers according to the time-of-day constraints of each phone number in the list, based on local time of day of the locality associated with the phone number to be called.

10. The system of claim 8, wherein the call processing system sets up a call to the first phone number in a list of phone numbers, waits a predefined period, if call is not answered or busy, then sets up a new call to the next phone number in the list. The process repeats sequentially unit all of the phone number are included in the call tree or one of the calls is answered. The call is connected when one of the calls is answered. The call terminates if all the phone numbers are busy or none of the calls are answered for a predefined period.

11. The system of claim 8, wherein the call processing system sets up a call to all of the phone numbers in the list simultaneously. The call is connected when one of the calls is answered. The call terminates if all the phone numbers are busy or none of the calls are answered for a predefined period.

12. The system of claim 8, wherein the call processing system sets up a call to a list of numbers according to the methods of claim 2, 3, or 4. The process repeats for a predefined number of times or until one of the calls is answered.

13. The system of claim 8, wherein the call processing system announces one of the phone numbers to the caller and sets up the call to the phone number if the caller confirms the phone number. The process repeats until the caller chooses one of the phone number or at the end of the list.

14. The system of claim 8, wherein the cal processing system sets up a call to one of the access numbers on the list of callee's preferred callback number. The caller is disconnected after the call is accepted by the callback system provided by some phone service providers and both caller and callee's phone number information are sent to the callback system. The call processing server system connects the call when the callback system calls back.

15. A non-transitory tangible computer readable storage medium comprising computer executable instructions for providing speed dialing on a phone station to call a person to be contacted with multiple PSTN numbers according to a pre-selected dialing algorithm, to perform the steps of:

provisioning a list of phone numbers of a person to be contacted; associating an intelligent speed dialing code with the list of phone numbers of a person to be contacted;

associating a user dialing preference with each intelligent speed dialing code;

storing the lists of phone numbers and user dialing preferences;

retrieving a list of phone numbers of the person to be contacted associated with the intelligent speed dialing code which is associated with the speed dialing digits on the phone;

retrieving a user dialing preference associated with the intelligent speed dialing code;

connecting the call to at least one of the phone numbers of the person to be contacted using the dialing algorithm including in the user dialing preference;

where the user can select at least one dialing pre-defined algorithm and the associated intelligent speed dialing code with a call dialing preference, comprising:

time-of-day constraints of each phone number can be called;

sequentially calling a list of phone numbers;

simultaneously calling a list of phone numbers;

repeatedly dialing a list of phone numbers if the phone numbers are busy;

prompt caller before calling a list of phone numbers;

a list of callee's call back preferred number.

16. The product of claim 15, wherein the computer instructions perform steps to place a call to at least one of the phone number according to the time-of-day constraints of each phone number in the list based on the local time of day of the locality associated with the phone number to be called.

17. The product of claim 15, wherein the computer instructions perform steps to place a call to the first phone number in a list of phone numbers, waits a predefined period, if the call is not answer or busy, then sets up a new call to the next phone number in the list. The process repeats sequentially until all of the phone numbers are included in the call tree or one of the calls is answered. The call is connected when one of the calls is answered for a predefined period.

18. The product of claim 15, wherein the computer instructions perform steps to place a call to all of the phone numbers in the list simultaneously. The call is connected when one of the calls is answered. The call terminates if all the phone numbers are busy or none of the calls are answered for a predefined period.

19. The product of claim 15, wherein the computer instructions perform steps to place a call to a list of phone numbers according to the methods of claims 2, 3, or 4. The process repeats for a predefined number of times or until one of the calls is answered.

20. The product of claim 15, wherein the computer instructions perform steps to announce one of the phone numbers to the caller and to place the call to the phone number if the caller confirms the phone number. The process repeats until the caller chooses one of the phone numbers or at the end of the list.

21. The product of claim 15, wherein the computer instructions perform steps to place a call to one of the access numbers on the list of callee's preferred callback number. The caller is disconnected after the call is accepted by the callback system provide by some phone service providers and both caller and callee's phone number information are sent to the callback system. The call processing server system connects the call when the callback system calls back.

* * * * *